United States Patent
Arsten et al.

(10) Patent No.: US 9,212,089 B2
(45) Date of Patent: Dec. 15, 2015

(54) SLOT DIE COATING PROCESS

(75) Inventors: Nanning Joerg Arsten, Aachen (DE); Pascal Josef Paul Buskens, Heerlen (NL); Marnix Rooijmans, Born (NL)

(73) Assignee: DSM IP ASSETS B.V., Heerlen (NL)

( * ) Notice: Subject to any disclaimer, the term of this patent is extended or adjusted under 35 U.S.C. 154(b) by 371 days.

(21) Appl. No.: 13/254,055

(22) PCT Filed: Mar. 8, 2010

(86) PCT No.: PCT/EP2010/052909
§ 371 (c)(1),
(2), (4) Date: Nov. 21, 2011

(87) PCT Pub. No.: WO2010/100285
PCT Pub. Date: Sep. 10, 2010

(65) Prior Publication Data
US 2012/0058260 A1    Mar. 8, 2012

(30) Foreign Application Priority Data

Mar. 6, 2009   (EP) .................................. 09154522

(51) Int. Cl.
| | |
|---|---|
| *B05D 5/06* | (2006.01) |
| *C03C 17/00* | (2006.01) |
| *B05D 1/26* | (2006.01) |
| *B05D 3/02* | (2006.01) |

(52) U.S. Cl.
CPC ............... *C03C 17/006* (2013.01); *B05D 1/26* (2013.01); *B05D 3/0254* (2013.01); *C03C 2217/42* (2013.01); *C03C 2218/11* (2013.01); *C03C 2218/32* (2013.01)

(58) Field of Classification Search
CPC .............. C03C 17/006; C03C 2218/32; C03C 2217/42; C03C 2218/11; B05D 1/26; B05D 3/0254

USPC .................................................... 427/160–169
See application file for complete search history.

(56) References Cited

U.S. PATENT DOCUMENTS

| | | | | |
|---|---|---|---|---|
| 6,139,613 A | * | 10/2000 | Hendrickson et al. | ......... 106/415 |
| 2006/0019114 A1 | * | 1/2006 | Thies et al. | ................... 428/522 |

(Continued)

FOREIGN PATENT DOCUMENTS

| | | | | |
|---|---|---|---|---|
| JP | 2004354601 A | * | 12/2004 | .............. G03F 7/004 |
| WO | WO 99/42860 | | 8/1999 | |
| WO | WO 2008/028640 | | 3/2008 | |

OTHER PUBLICATIONS

Machine Translation of JP 2004-354601A.*

(Continued)

*Primary Examiner* — Michael Wieczorek
*Assistant Examiner* — Michael G Miller
(74) *Attorney, Agent, or Firm* — Nixon & Vanderhye P.C.

(57) ABSTRACT

The present invention relates to a process for applying an optical coating to a substrate comprising the steps of (a) preparing an optical coating formulation comprising a solvent component and a film forming component; (b) using a die coater to form a coated substrate by applying the optical coating to a substrate, where the applied optical coating forms a wet film thereon having a thickness from 8 μm to 100 μm; (c) drying the coated substrate, where the coated substrate is in a substantially horizontal plane thereby converting the wet film to a dry film having a thickness of less than 1 μm. The optical coating formulation comprises greater than 0.3 wt % to no more than 10 wt % solids relative to the total weight of the optical coating formulation. The coated substrate may be optionally cured.

13 Claims, 2 Drawing Sheets

(56) References Cited

U.S. PATENT DOCUMENTS

2006/0068115 A1     3/2006    Ogawa
2007/0062445 A1     3/2007    Kodou et al.
2007/0231478 A1*   10/2007   Watanabe et al. ............. 427/162

OTHER PUBLICATIONS

International Search Report for PCT/EP2010/052909, mailed Jun. 8, 2010.
International Preliminary Report on Patentability for PCT/EP2010/052909, dated Jan. 3, 2011.
Database WPI Week 200505, Thomson Scientific, Accession No. 2005-043078 & JP No. 2004-354601 Abstract, (Dec. 16, 2004).
Seiki, Yasui Co., "Slot die basics", [Online], (Apr. 15, 2008), http://web.archive.org/web/20080415122240/www.yasui.com/2004/slotdie.htm.
JP Office Action (Notice of Reasons for Rejection) dated Sep. 3, 2013 with English-language translation.

* cited by examiner

SLOT DIE COATING PROCESS

This application is the U.S. national phase of International Application No. PCT/EP2010/052909, filed 8 Mar. 2010, which designated the U.S. and claims priority to EP Application Nos. 09154522.8, filed 6 Mar. 2009, the entire contents of each of which are hereby incorporated by reference.

FIELD

The invention relates to a process for applying an optical coating to a substrate and the product thereof.

BACKGROUND AND SUMMARY

Optically functional coated substrates are known. An optically functional coating is a coating aims at controlling optics, e.g. UV blocking or and anti-reflective coatings. For example, optically functional coated plates are used in architectural glass, horticultural glass, solar panels, picture frames glass, display glass (e.g. museum glass), electronic display glass (e.g. LCD display glass) and the like. A prototypical example of an optical coating is an anti-reflective coating. Untreated float glass plates show a strong light reflection generally of about 10% when looking at the glass at a near normal angle (5° offset). This typically reduces the functionality and often the aesthetics of the substrate and is therefore unwanted.

Optical coatings are commonly applied using either so-called dry application techniques like sputtering or physical vapor deposition or wet application techniques, e.g. dip, spray or curtain coating.

In a dip-coating process, the glass plate is dipped in a container with a coating fluid, and withdrawn at a certain speed. This process is commonly used for the application of optical thin films. Although this process is more cost-efficient than a "dry" application technique, it is accompanied with a number of disadvantages: the process involves handling of large amounts of chemicals, the coating is applied to both sides of the glass which for some applications is unnecessary or even disadvantageous, the coating speed is relatively low (up to 1 m·min$^{-1}$), the coatings show a gradient in thickness due to gravity and other typical non-homogeneities, e.g. side effects due to evaporation.

Wet processes that allow application of a coating on one side of the substrate at speeds comparable to dry processes, include spray or curtain coating. However, the resultant coatings are typically very inhomogeneous. In single-layer anti-reflective coatings, this manifests itself in form of reflection and colour differences leading to a reduction in aesthetics and functional performance of the coated article.

In WO99/42860, a multilayer antireflective coating is applied using direct current spluttering or chemical vapor deposition (CVD). A protective polymer layer is then applied using a slot coater. A problem with this technique is that the optical coating is required to be applied in several layers using a dry technique (e.g, spluttering or CVD), with an additional protective wet layer applied. This technique is complex and expensive, in terms of coating equipment costs and running costs.

In JP2004-354601, the coating of a photosensitive film with a coating composition comprising a photo-sensitive resin and a non-volatile content of between 10 wt % and 25 wt %. After coating, the coated substrate is dipped in an alkaline developing solution to form the desired black matrix. A problem with this technique is that it may only be used at a coating speed of less than 200 mm/sec or less (12 meters per minute or less) due to the contamination of air bubbles in the film.

In WO07/093342, the application of an anti-reflective layer using a slot coater was disclosed in which a wet film thickness of between 1 and 5 μm was directed. Although this process provided an anti-reflective coating, further improvements are required in regard to the minimizing the variation in thickness and increasing the speed of application.

The aim of the present invention is to provide a wet process for applying an optical coating to a substrate and the product thereof, which at least partially overcomes the abovementioned pitfalls.

DETAILED DESCRIPTION

Figure 1:
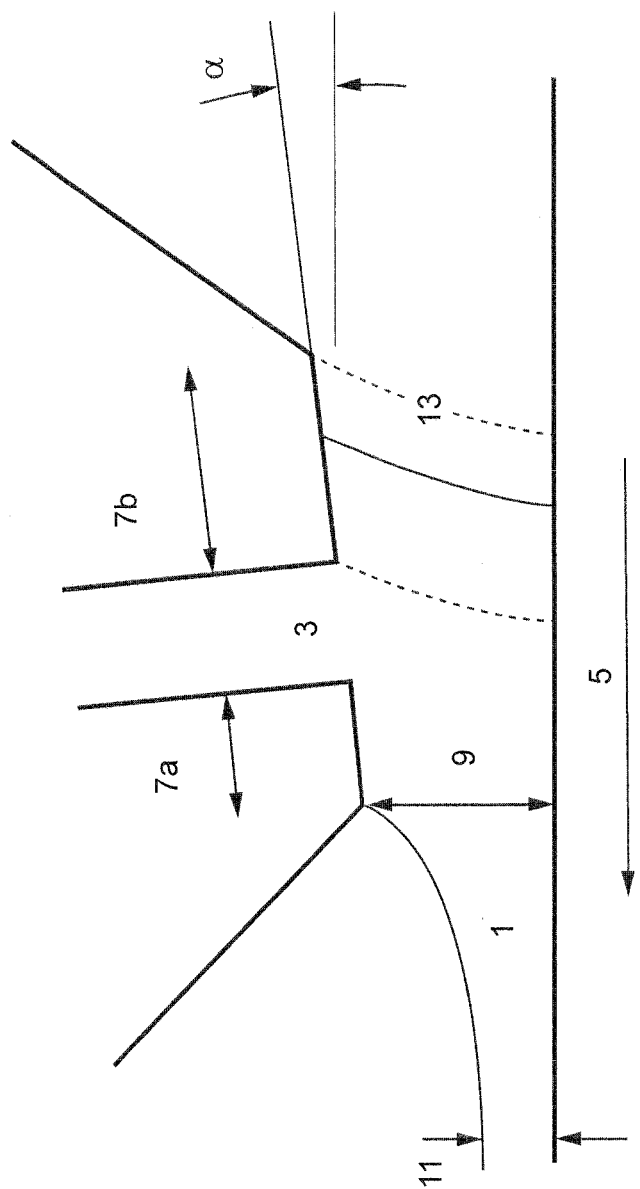
FIG. 1 is a schematic diagram showing a slot die coating process for coating a moving substrate that may be employed in the embodiments disclosed herein.

In one aspect of the present invention there is provided a process for applying an optical coating to a substrate comprising the steps of:
a. preparing a (preferably optical) coating formulation comprising a solvent component and a film forming component;
b. using a die coater to form a coated substrate by applying the optical coating to a substrate, where the applied optical coating forms a wet film thereon having a thickness from 1 μm to 100 μm;
c. drying the coated substrate, where the coated substrate is preferably in a substantially horizontal plane thereby converting the wet film to a dry film having a thickness of less than 1 μm; and, optionally
d. curing the coated substrate.

The die coater is preferably a slot or slit coater.

For an economically feasible process, the amount of solids in the coating formulation generally will be 0.1 wt % or more, preferably greater than 0.3 wt %, preferably 0.4 wt % or more, preferably 0.5 wt % or more, more preferably 1 wt % or more relative to the total weight to the coating formulation. A solids loading in the optical coating formulation is preferably no more than 10 wt %, more preferably no more than 7 wt %, even more preferably not more than 5 wt % and most preferably no more than 3 wt %. A lower solids loading has been found to contribute towards lower thickness variation in the coating of the coated substrate.

The wet film thickness is preferably from 2 μm to 80 μm, more preferably from 6 μm to 70 μm, more preferably 8 μm to 60 μm, more preferably 9 μm to 50 μm, even more preferably from 10 μm to 40 μm and most preferably from 12 μm to 30 μm.

The dry film thickness is preferably less than 800 nm, more preferably less than 500 nm, more preferably less than 200 nm, even more preferably less than 150 nm and yet even more preferably less than 100 nm, depending upon the intended end-use application.

The solids preferably comprise nano-particles, as it has been found that the interaction of the nano-particles in the high solvent levels as the coating dries and preferably cured is particularly advantageous at achieving high quality optical coatings, although the nature of this interaction is not fully understood. However, in comparison to organic polymers, the dispersal of nano-particles with an inorganic shell in the solvent is more difficult and hence the ability to produce a corresponding coatings with a low level of thickness variation is also more difficult.

It is noted that the relative high surface areas (e.g. >0.1 m$^2$, more preferably >1 m$^2$) in which the ratio of the width to the length is from 0.1 to 10 (e.g. not a elongated strip or tape), it would be expected that the low solids content would be prone to greater distribution variations over the surface due to flow variations. Surprisingly, this was not the case.

A substantially horizontal plane is to be given a purposive meaning and, as such, a substantially horizontal plane encompasses small deviations from the horizontal plane which do not significantly affect the ability of the process to produce a homogeneous dry film coating. Preferably, deviations from the horizontal plane are less than 5 degrees (°), preferably less than 3°, more preferably less than 1°, even more preferably less than 0.1° and most preferably less than 0.01°. It will be understood that as the solvent component is removed from the wet film and the viscosity of the drying film increases, greater deviations from the horizontal plane may be possible without significantly affecting the homogeneous nature of the resultant dry film or coating.

Wet film is a term used in the art of coating which means a coating layer comprising the solvent component and the film forming component.

Dry film is a term used in the art of coating which means the wet film after it has been dried and substantially all of the solvent component has been removed. Preferably the dry film comprises, relative to the total weight of the dry film, less than 1 wt % and more preferably less than 0.1 wt % solvent.

It will be understood that a parameter range may be defined by all combination of upper and lower limits relating to said parameter.

All % are expressed as weight % of the total composition, unless otherwise indicated.

The substrate is preferably a rigid substrate, such that its shape is self supporting under its own load when supported at its edges on a 1 m×1 m sample, as the process of the present invention is particularly suited to processing substrates having a thickness variation of up to 20 μm or even more.

It has been unexpectedly found that through using a relatively low solids loading in the optical coating formulation coupled with a relatively high wet film thickness, that the coating, drying and, optionally, curing steps may be controlled with a high degree of precision, such that there is a low variance in optical properties exhibited in the optical coated substrate. As a result, the functional performance and aesthetics of coated substrates using the process of the present invention is enhanced over coated substrates produced using conventional wet coating application techniques.

Conventionally, the wet film thickness is minimized for economical reasons attached to the removal of solvents. The minimum wet coating thickness is usually determined by reducing the flow rate through the slot die until there is complete bead failure, edge failure, a combination of edge and bead failure or significant narrowing of the coating width. Indeed, it is counter-intuitive for a skilled person to increase the thickness of the wet film to improve process control, given the increased risk of thickness variation derived from the increased magnitude of solvents removed during the drying step.

The present invention is able to coat substrates at commercially acceptable speeds (e.g. greater than 5 or 10 meters per minute and more preferably greater than 20 meters per minute) while maintaining a low variance in wet and dry coating film thickness and the resulting optical properties. Operating speeds of up to 50 or 100 meters per minute or even more may be achieved depending upon the combination of substrate and coating formulation used.

In another aspect of the present invention, there is provided an optically coated substrate, wherein the substrate is coated on at least one side that has a surface area of at least 0.01 m$^2$, wherein the coating (i.e. dry film) has a thickness of no more than 1 μm, preferably no more than 500 nm, more preferably no more than 200 nm, more preferably no more than 160 nm, even more preferably no more than 150 nm, yet even more preferably no more than 140 nm and most preferably less than 100 nm and variation in average coating thickness of less than 25 nm preferably less than 20 nm and most preferably less than 15 nm across the surface area.

Preferably, the substrate is rigid. Preferably, the rigid substrate is made of glass.

Preferably, the substrate has a surface area of at least 0.1 m$^2$ and more preferably at least 1 m$^2$ and even more preferably at least 2 m$^2$. The importance of low variance in optical properties generally increases with an increase in the surface area of the coated substrate, e.g. anti-reflective solar cell cover glass.

Preferably, the coating has a thickness gradient of less than 10 nm per meter and more preferably less than 5 nm per meter. Due to the drying step being performed when the substrate is in a substantially horizontal plane, substantially no thickness gradient is observed in the optical coating of the present invention (e.g. a gradient of less than 1 nm per meter).

For the purposes of this application an optical coating is a coating which exhibits optical functional properties, such as anti-reflective properties (e.g. reduce reflection by at least 50%, more preferably at least 70%), light scattering properties, UV light blocking properties (e.g. reduce UV transmission by at least 70%, more preferably 85%) and the like.

Preferably, the optical coating is an anti-reflective or a UV coating. Preferably, the variation in the optical wavelength at which the minimum reflection of the coating occurs is less than 50 nm and more preferably less than 30 nm across the total coated surface area of the substrate. The variation in thickness of the coating (2×standard deviation), as determined by the variation in the wavelength of minimum reflection, is preferable less than 40 nm, more preferably less than 30 nm, even more preferable less than 20 nm and most preferably less than 10 nm.

The ability to minimize optical variations across the coating enhances functional performance and aesthetics of the optical coatings. For example, architectural, horticultural, and solar applications all rely on the functional properties of the optical coating to efficiently and effectively filter, transform or modify visible and invisible radiation. To take maximum advantage of this, the coating and the substrate are preferably transparent.

In embodiments in which the optical coating is an anti-reflective coating, the reflection (determined using a conventional method) of the coated side of the substrate (e.g. glass) at the wavelength exhibiting a minimum is about 3% or less, preferably about 2% or less, and more preferred about 1% or less. The average reflection over a 425 to 675 nm wavelength range is generally about 4% or less, preferably about 3% or less, and even more preferably about 2% or less.

A light reflection reducing (or anti-reflective) coating is a coating that reduces the reflection of light from a substrate at least one wavelength between 425 and 675 nm, as measured at 5 degrees to the normal incident angle. Measurements are carried out on the coated and uncoated substrate. Preferably the reduction in reflection is about 30% or more, preferably about 50% or more, more preferably about 70% or more, even more preferably about 85% or more. The reduction in reflection as expressed in a percentage is equal to 100× (reflection of the coated substrate—½×the reflection of the uncoated substrate)/(½×reflection of uncoated substrate).

Die Coating

In a die coating process (FIG. 1), the coating (1) is squeezed out by gravity or under pressure through a slot or slit (3) onto a moving substrate (5). Alternatively, the slot-die can be moved over the substrate with a defined speed. The speed of the substrate relative to the slot die enables coatings to be considerably thinner than the width or gap of the slot. The ability to accurately control the uniformity of the wet film coating is dependant upon complex interactions between the optical coating formulation, the die slot geometry and the slot positioning relative to the substrate.

Parameters which have been found to be particularly important in controlling the uniformity of the optical coating include the slot gap (3), the lip thickness (7a, 7b) and the coating gap (9).

Slot Gap

The slot gap (3) is preferably between 2 and 10 times the thickness of the wet film. Slot gap thickness below the thickness of the wet film limit application rates and are more susceptible to thickness variation, while a slot gap thickness above 10 times the thickness of the wet film is prone creating a vortex in the coating stream, thereby reducing coating quality. Preferably, the slot gap thickness is at least 1.5, more preferably at least 2.0, more preferably 2.5 even more preferably at least 3 times, even more preferably at 4 times and yet even more preferably at least 5 times and most preferably at least 6 times the thickness of the wet film. Preferably, the maximum slot gap thickness is less than 15, more preferably 12, even more preferably 9, even more preferably 7 and more preferably less than 4 times the thickness of the wet film. To minimize film thickness variation, the slot gap is preferably fixed. However, in alternative embodiments, an adjustable slot gap may be advantageously used to optimize coating conditions to specific substrates and optical coating formulations.

Lip Thickness

The downstream lip (7a) thickness ($L_D$) is preferably 3 mm or less more preferably 2 mm or less, more preferably 0.90 mm or less, more preferably 0.60 mm or less, more preferably 0.50 mm or less, even more preferably 0.40 mm or less and most preferably 0.30 mm or less. A lip thickness of at least 0.15 mm and preferably at least 0.20 mm is preferred for reasons of cost. It has been found that the smaller $L_D$ the larger the operable coating gap (9). The upstream lip (7b) thickness ($L_u$) is preferably 5 mm or less, more preferably 2 mm or less, more preferably 0.90 mm or less, more preferably 0.60 mm or less, more preferably 0.50 mm or less, even more preferably 0.40 mm or less and most preferably 0.30 mm or less. A lip thickness of at least 0.15 mm and preferably at least 0.20 mm is preferred for reasons of cost associated with high precision machining. The surface of the lip may be set at an angle α of between 0 and 30° to the horizontal axis. In a preferred embodiment the surface of the lip is parallel to the substrate (α=0°).

Coating Gap

Due to thickness variations of some substrates, particularly rigid substrates, a relatively large coating gap is preferred. Preferably, the coating gap (9), measured from the lip down stream and distil to the slot gap (i.e. the minimum gap), is at least 20 μm, more preferably at least 40 μm, more preferably at least 60 μm, even more preferably at least 80 μm and most preferably at least 100 μm. A maximum coating gap of not more than 1000 μm is preferred to prevent flow instabilities affecting coating quality.

In a special embodiment of the present invention, the slot die comprises a slot gap (3) defined up an upstream lip (7a) positioned upstream from the flow of the optical coating and a downstream lip (7b) positioned downstream from the flow of the optical coating, wherein
a. the height (9) between the downstream lip distil to the slot gap and the substrate is at least 20 μm;
b. the slot gap is in the range of 1.1 to 15 times the thickness of the wet film (11); and
c. the thickness of the downstream lip (7b) is less than 0.90 mm.

This specific combination of features is especially preferred for use on rigid substrates (e.g. glass).

Vacuum

Preferably, the slot die further comprises a reduced pressure means (e.g. an under-pressure chamber or vacuum box) for stabilization of the upstream bead meniscus (13) of the applied optical coating. The application of a reduced pressure means is particularly preferred at higher coating speeds (e.g. at least 10 meters per minute, more preferably at least 12 meters per minute) and at larger coating gaps (e.g. at least 100 μm)

In a special embodiment, the slot die comprises a slot die gap of at least 1.1 times more preferably 2.0 times, more preferably 3 times, more preferably 4 times, more preferably 5 and even more preferably at least 6 times the thickness of the wet film in combination, preferably with a reduced pressure means for stabilization of the upstream bead meniscus of the applied optical coating. This combination of features enables increased coating speeds while maintaining the required uniformity in coating thickness and functionality.

Substrate

Suitable substrates include any flat, clean non-porous surface. Substrates preferably have a thickness variation of less than half the coating gap, more preferably 100 μm, more preferably 50 μm, more preferably 30 μm and more preferably less than 20 μm. The less thickness variation of the substrate the less thickness variation of the optical dry film coating. Suitable rigid substrates include glass (e.g. borosilicate glass, soda lime glass, glass ceramic, aluminum silicate glass), ceramics, metal sheets (e.g. aluminum, stainless steel, steel), plastics (e.g. PET, PC, TAC, PMMA, PE, PP, PVC and PS) or composite materials. Suitable flexible substrates include polymeric or cellulose based films, including laminates thereof.

Optical Coating Formulation

The optical coating formulation used in this invention is preferably a film forming component comprising nano-sized particles and a binder and a solvent component comprising a solvent or diluent.

Nano-Sized Particles

Preferably, the nano-sized particles comprise at least one metal oxide or fluoride or metal oxide or fluoride precursor. More preferably, the nano-sized particles comprise at least one inorganic or metal oxide or inorganic or metal oxide precursor.

Preferably, the metal oxide or metal oxide precursor forms at least 30 wt %, more preferably at least 40 wt %, even preferably at least 50 wt %, yet even more preferably at least 60 wt % and most preferably at least 70 wt % of the film forming component.

Examples of suitable particles are particles comprising lithium fluoride, calcium fluoride, barium fluoride, magnesium fluoride, titanium dioxide, zirconium oxide, antimony doped tin oxide, tin oxide, aluminum oxide, and silicon dioxide. Preferably, the metal oxide is aluminum oxide or silicon dioxide. Preferably, the particles comprise silicon dioxide, more preferably particles comprise at least 60 wt. %, even more preferably at least 80 wt. % and most preferably at least 90 wt. % silicon dioxide.

The particle size g is defined as 0.5×(length+width) for non-spherical particles and as the radius for spherical particles. Preferably, the average particle size g is 500 nm or less, more preferably 250 nm or less, more preferably 125 nm or less, more preferably 100 nm or less, most preferably 50 nm or less. Preferably, the average particle size is 5 nm or more, more preferably 7 nm or more, most preferably 10 nm or more. The sizes of the particles may be determined by spreading a dilute suspension of the particles over a surface and measuring the sizes of individual particles by using microscopic techniques, preferably scanning electronic microscopy (SEM) or atomic force microscopy (AFM). Preferably the average sizes are determined by measuring the sizes of 100 individual particles.

In a preferred embodiment, polymer nanoparticles with a metal oxide shell are used. Preferably, the specific polymer core-size $g_{core}$ is larger than 5 nm, more preferably larger than 7 nm, most preferably larger than 10 nm. Preferably, the specific polymer core size is smaller than 500 nm, more preferably smaller than 250 nm, more preferably smaller than 125 nm, more preferably smaller than 100 nm, most preferably smaller than 50 nm.

In another preferred embodiment, hollow metal oxide nanoparticles are used. Preferably, the specific void size is larger than 5 nm, more preferably larger than 7 nm, most preferably larger than 10 nm. Preferably, the specific void size $g_{void}$ is larger than 5 nm, more preferably larger than 7 nm, most preferably larger than 10 nm. Preferably, the specific polymer core size is smaller than 500 nm, more preferably 250 nm, more preferably 125 nm, more preferably smaller than 100 nm, most preferably smaller than 50 nm.

The viscosity of the optical coating formulation is dependent upon the coating and solvent components in the optical coating formulation and, in particular the solids loading. Preferably, the viscosity of the optical coating formulation is about 0.2 mPa·s or more, preferably 1.0 mPa·s or more and even more preferably about 2.0 mPa·s or more. Generally, the viscosity is about 100 mPa·s or less, preferable about 10 mPa·s or less, mare preferably about 6.0 mPa·s or less, and even more preferred about 3.0 mPa·s or less.

The viscosity can be measured with an Ubbelohde PSL ASTM IP no 1 (type 27042).

The surface tension of the optical coating formulation is preferably in the range of 20-73 mN·m$^{-1}$ (dyn·m$^{-1}$), more preferably in the range of 22-40 mN·m$^{-1}$ (dyn·m$^{-1}$), and even more preferably in the range of 24-30 mN·m$^{-1}$ (dyn·m$^{-1}$). A low surface tension is desired to enable the coating to readily form a film over the substrate surface.

The optical coating formulation is preferably Newtonian in character, such that the viscosity is substantially constant with variations in shear rate experienced within the operation of the slot die coater.

Binder

The coating preferably comprises a binder, which has as main function to keep the particles attached and adhered to the substrate. Preferably the binder comprises at least one oligomeric or polymeric compound. Preferably, the binder forms covalent bonds with the particles and the substrate. For this purpose, the binder—before curing—preferably contains inorganic compounds with alkyl or alkoxy groups, but other compounds may be suitable as well. Further, the binder preferably polymerises itself to form a continuous polymeric network.

In one embodiment of the invention the binder of the coating consists substantially of an inorganic binder, as such coating shows good mechanical properties and good adhesion to the substrate, resulting in, for example, high puncture resistance, high scratch resistance and good wear resistance.

The inorganic binder preferably comprises one or more inorganic oxides, for example silicon dioxide and alumina. The binder preferably is a crosslinked inorganic material that covalently links the particles and the substrate.

The inorganic binder may result after the cross-linking reaction and heating of the non-reacted binder, for example an alkoxy silane, an alkyl silicate, a sodium silicate, aluminum nitrate or aluminum sec-butoxide. As alkoxy silanes preferably tri and tetra alkoxy silanes are used. Preferably, ethyl silicate binders are used. Due to the heating step these silicon and aluminum compounds are converted into silicon dioxide and alumina, respectively.

In another embodiment, the binder is an organic coating, wherein the particles bear reactive organic groups, and optionally, further coating material is present which has groups, reactive with the reactive groups on the particles. This embodiment is preferred in case the substrate is of organic nature, and cannot withstand baking temperatures of up to 400° C. In one embodiment, the reactive groups on the particles are (meth)acrylate, and the reactive groups on the further coating material is of ethylenic unsaturated, preferably (meth)acrylate. Examples of suitable coatings are described in WO2004/104113.

Depending on the chemistry of the binder, many solvents are useful. Suitable examples of solvents include water, non-protic organic solvents, and alcohols.

In one embodiment, an inorganic binder and organic solvent is used, more preferably the solvent is a mixture of water and alcohol. The wt % of the particles, based on 100% of solids is preferably more than 50 wt. %, preferably more than 60 wt. % and most preferably more than 70 wt. % in the final coating. The concentration of solids is the concentration of all components that don't evaporate after the application of the coating composition to the substrate and subsequent drying and, if required, curing steps.

The coating composition may comprise a compound to catalyze the conversion of the precursor into the binder. In case of alkoxy silane or ethyl silicate binders as the precursor preferably an acid, for example acetic acid is used as the catalyst. The catalyst preferably is added to the coating composition just prior to its application. In case of UV curable materials, a light sensitive initiator is generally used as catalyst.

Solvent

For organic binders, a fully organic solvent system is preferred, although some water may be present. Examples of suitable solvents include 1,4-dioxane, acetone, chloroform, cyclohexane, diethylacetate, propanol, ethanol, methanol, butanol, methyl ethyl ketone, methyl propyl ketone, tetrahydrofuran, toluene and tetrafluoroisopropanol. Preferred solvents are methanol, methyl ethyl ketone, isopropanol, 1-methoxypropan-2-ol or an ether (e.g. diethyl ether).

It is an advantage of the present invention that the coating is insensitive to moisture. Thus the coated substrate need not be stored in a humidity controlled environment with humidity variation between for example 30 and 80% acceptable. Further, the inorganic coating also is not sensitive to time delays between coating and curing. The organic UV curable coating is generally cured directly after application, although this is also not critical.

Preferably the coating composition is applied to the substrate in a thickness eventually resulting in a thickness after drying or curing of about 20 nm or more, preferably of about 50 nm or more, more preferably about 90 nm or higher. Preferably, the thickness of the coating after drying or curing (dry film thickness) will be 500 nm or less, more preferably about 200 nm or less, preferably of about 180 nm or less, more preferably about 160 nm or less, and even more preferably about 140 nm or less.

In one embodiment of the process, the coating application is applied to a glass plate before the glass has been tempered. Tempering introduces internal stresses in an ordinary glass plate so it fragments in small pieces if the glass plate breaks. Tempering methods are known to those skilled in the art and usually involve heating the glass to about 700° C. One advantage of the coating according to the invention is it can withstand tempering. Thus, the curing and tempering process can be carried out in one step.

In one embodiment of the invention, the coating is applied (semi-) continuously in line of a glass-plate manufacturer, and then the coating is cured while the glass is tempered.

The invention will be further illustrated by the following non-limiting examples.

Operation

It is a preferred object of the invention to obtain a coating of consistent thickness and optical properties across the substrate. To achieve this, suitable precision known in the art may be used during coating, drying and curing to prevent variations in flow and movement of the optical coating as it is applied to the substrate.

Coating Step

In operation, the optical coating formulation is fed through the die coating, preferably via a suitable pulse free pump. The optical coating formulation proceeds through the slot die exiting through the slot gap which is defined by an upstream and downstream die lip. The surface roughness (as defined by $R_a$) of the die components contacting the optical coating formulation is preferably less than 0.05 microns. In one embodiment, the optical coating formulation is placed onto the moving substrate, with the optical coating flow rate determining the thickness of the deposited wet film layer. The slot die is preferably positioned above or below the substrate such that the substrate and deposited coating are maintained on a substantially horizontal plane. More preferably the slot die is positioned above the substrate. In some embodiments, the slot die is position at the side of the substrate such that the substrate is in an inclined or vertical position. This configuration is preferably used when coating a flexible substrate, in which the orientation of the flexible substrate can, immediately after application of the coating, be re-orientated to a substantially horizontal plane, such that the drying process is essentially carried out on the horizontal plane.

Generally, at least one side of the substrate needs to be coated e.g. in case a picture or a solar-cell substrate is glued to the other side of the substrate (e.g. glass). In an alternative embodiment of the invention, the substrate is coated on both sides, (e.g. with an anti-reflective coating). This may be achieved by coating both sides of a substrate. It is also possible to laminate two substrates which are coated on one side, whereby the non-coated sides are laminated to each other. It is preferred, that the substrate in use has on both outermost sides an optical coating. It is, however, also possible to combine different techniques to obtain various functionalities. Other useful functionalities include anti-fogging, anti-fouling, anti-stick, easy-clean, lubricious, anti-static, low-emission coatings (such as low-heat emission), and the like.

Drying Step

The wet film layer comprising a wet component and a dry component. The wet component preferably comprises non-reactive solvents and/or diluents which evaporate from the wet film to thereby form a dry film, comprising the solids or film forming components of the optical coating formulation. Evaporation occurs while the substrate is in a horizontal plate to avoid a thickness gradient developing due to gravity effects on the drying film.

The process according to the present invention may apply more than one coating film, with intermediate drying performed after the application of each coating layer. In some embodiments, intermediate drying and curing is performed after the application of some or all of the layers.

The drying step preferably takes place under ambient conditions (e.g. 23° C. (plus or minus 2 degrees) and less than 50% relative humidity), although elevated temperatures (e.g. greater than 40° C., more preferably greater than 50° C.) may also be used to shorten the total drying time. The exact drying conditions may be determined by a person skilled in the art based upon the solvent or diluting agent being evaporated.

The dry film thickness variation (maximum thickness—minimum thickness in a circular area of preferably at least 0.5 meter radius and more preferably at least 1 meter radius (or equivalent thereof) using at least 5, preferably at least 10, analyses at approximately equally spaced points) is preferably less than 80 nm, more preferably less than 50 nm, more preferably less than 30 nm, more preferably less than 25 nm even more preferably less than 20 nm and most preferably less than 10 nm. In embodiments in which the coated substrate area is less than the equivalent of a circle of 1 meter radius, then thickness and functional variance is determined over the total available coated surface area. The dry film thickness variation may be determined using any suitable means, such as spectroscopically (reflectometery or ellipsometery) or by directly observing a fracture surface by electron microscopy. For anti-reflective coatings, the thickness variation may be calculated through calculating the variation in the wavelength at which the minimum reflection value is observed.

Curing Step

Preferably, after the wet component has been substantially removed, the optical coating film may be cured. Curing may be performed using a number of techniques including thermal curing, UV curing, electron beam curing, laser induced curing, gamma radiation curing, plasma curing, microwave curing and combinations thereof.

The coatings may be applied as a single layer, or multiple layers may be applied with each layer dried or semi-layer, and preferably cured, before the application of the next coating layer.

EXAMPLES

Methodology

Visual Interpretation of the Coating Quality:

Prior to the spectroscopic investigation of the coated glass plates the samples were subjected to a visual inspection under an industrial TL lamp (OSRAM L Coolwhite 18W/840). The coating homogeneity was judged in reference to solar cover panel application and, as such, if variations in (blue) reflection color are acceptable since it will not affect the power output efficiency and will not be visible when laminated to the (blue-colored) solar-cells. An acceptable variation in blue reflection color was found to correspond to a 2× standard deviation in the average coating thickness of less than 40 nm and preferably less than 30 nm and even more preferably less than 20 nm.

Spectroscopic Interpretation of the Coating Quality:

For each experiment 2 glass sheets of 820×600 mm were coated and cured accordingly to the above described methodology. The optical reflection of each sheet was measured on 10 equidistant points of size 4 cm$^2$ forming a grid pattern as depicted in Table 1. The reflection was measured from 400 to 800 nm using a UV-VIS spectrophotometer from Shimadzu, type UV-2401 (PC) in combination with specular reflection unit of type 200-63687 with sample size opening diameter of 15 mm with an incident angle of 5° offset from the normal.

TABLE 1

Definition of the investigated positions per glass sheet (820 × 600 mm)

| Position number on glass sheet | Distance from the top of the glass sheet | Distance from the left side of the glass sheet |
|---|---|---|
| 1 | 155 | 300 |
| 2 | 195 | 150 |
| 3 | 195 | 450 |
| 4 | 300 | 365 |
| 5 | 420 | 150 |
| 6 | 420 | 300 |
| 7 | 420 | 450 |
| 8 | 535 | 230 |
| 9 | 660 | 170 |
| 10 | 660 | 430 |

Thickness Variance:

The dry coating thickness was derived from the position of the optically measured reflection minimum, according to formula:

Dry film thickness=position of measured reflection minimum [nm] divided by (4 times the refractive index of the coating).

The dry coating thickness for all coating was calculated with refractive index, which was determined as 1.3 using known methods. For example: If the reflection minimum is found at 720 nm, then is the dry coating thickness 720/(4× 1.3)=138 micron.

Determination of the Solids Content

The solids content of the undiluted formulation (4 g) was determined by removal of the solvents in an oven at 105° C. and reduced pressure of 200 mbar for 1 hour or until a constant weight was achieved.

Equipment Used:

The coatings were applied using a coating machine of type BA 18709 manufactured at Mathis AG, CH-8156, Oberhasli/Zürich, Switzerland. On this machine glass sheets of size 820 (L)×600 mm (W) were coated.

The machine was equipped with slot die, type TSE#215, manufactured at TSE Troller AG, CH-4853 Murgenthal, Switzerland. The slot die has the following characteristics:
500 mm wide slot die
AAA-precision level, roughness of lower die plates: Ra: 0.01, Rt:0.35
Dual cavity design, optimized for low-viscous/low solids 2-propanol/water coating formulations
55 micron outer slot gap
Dual cavity vacuum box (also supplied by TSE Troller AG)
Upstream lip length: 2 mm
Downstream lip length: 0.5 mm
Upstream and downstream lip angle: 90°

A pump system of type mzr-7259-hs s Ex from HNP Mikrosysteme GmbH, Germany equipped with an in-line stainless steel filter (10 micron mesh size) was used in combination with flow mass meter of type Promass A from Endress-Hauser, Switserland to feed the coating solution to the slot die.

Materials
Substrate:

The glass used was 2 mm thick float glass from Guardian. The glass sheets of this size typically show a flatness variation of in total 25-35 micron. The coated area on the glass was 650 (L)×500 mm (W).

Coating Composition:

The coating composition comprised core shell nanoparticles produced using latex (—available from DSM NeoResins BV) and tetramethoxysilane according to the method disclosed in WO2009/030703 and in particular page 6, lines 8 to 29. The weight ratio of the resultant silica to latex was 4:1, with the silica shell, latex core nanoparticles having the following properties:
pH after dilution with 2-propanol: 5.7
Particle size of latex in water (determined by DLS): 86 nm
Particle size of core-shell particle in water (determined by DLS): 108 nm
Particle size of core-shell particle in 2-propanol (determined by DLS): 147 nm
Polydispersity: <0.1
Isoelectric point: 4 to 5
Particle size core-shell after drying (determined by TEM) 75 nm
Shell thickness after drying (determined by TEM) 13 nm Nitric acid was then added to a pH of 2. The particle size was stable at 116 nm for at least two weeks.

Low and a high solids stock solutions were formulated (Table 2) from which the coating compositions with varying solids contents were derived from through further dilution with 2-propanol (IPA).

TABLE 2

Composition of coating formulation % wt.

| COMPONENT | Low solids | High solids |
|---|---|---|
| latex (NeoCryl XK-30) | 0.7 | 2.9 |
| Silica | 2.8 | 9.1 |
| IPA | 85.5 | 46.6 |
| Water | 11.0 | 41.4 |

The surface tension of the coating formulation were approximately 25 nN · m$^{-1}$ (dyn · m$^{-1}$).

Method

The coating apparatus, as described above, was used to apply the film to the glass substrate at a between 2 and 20 meters per minute. After the coating application the coated substrates were dried under ambient conditions (22° C. and 14-29% relative humidity) for at least 5 minutes. Subsequently the coated substrates were thermally cured in an oven (N500/65 HA manufactured by Nabertherm) at 450° C. for 1 hour. The temperature ramp-up from room temperature towards 450° C. took approximately 1 hour and the cooling down till 70° C. at least 4 hours. The curing process converted the silica coated latex nanoparticles into hollow silica nanoparticles, with the latex core thermally degrading during the curing process.

The following coating settings have been investigated in relation to coating quality as determined through reduction in reflection or visual appearance.

Wet film thickness
Coating gap to wet film thickness ratio
Coating speed

Some of the experimental condition resulted however in an unstable coating meniscus. For these experimental conditions creation of a vacuum upstream to the slot die was used to try to achieve a stable coating meniscus. For those experiments the use of vacuum assistance is specifically mentioned. All other experiments have been performed without vacuum assistance. Testing was performed in duplicate. The coating operation was performed at a room temperature of 22° C. and the relative humidity of between 15 and 29%.

Results

Example 1

The experiments in Tables 3a & 3b indicate that homogeneous coatings produced with a coating gap of 200 micron or more is achievable with very dilute coating formulations. At coating gaps of 200 micron or more the solids content is preferably below 1.5% (w/w).

All coatings were prepared at a coating speed of 8 m/min.

Experiments with a coating gap/wet film thickness ratios of >15 (comparative experiments C, F, G, I, J, K, L) resulted in an unstable coating bead (meniscus), resulting in very in-homogenous coating thicknesses or even uncoated areas in the coating. The use of vacuum assistance (up to −40 mbar) was unable to prevent this phenomena.

Surprisingly the range for the coating gap/wet film thickness ratio is much larger than reported in the literature. For example U.S. Pat. No. 5,925,432 states that this ratio should be in the order of 1 to 3 and should not exceed a ratio of 5 (page 8, line 31).

Tables 3a & 3b also indicates that coating gap/wet film thickness ratios within the scope of the invention resulted in coatings with good coating homogeneity. The 95% probability interval (2×standard deviation or 2σ) for the coating thickness variation is for all experiments in the range of 4 to 18 nm. As a coating gap/wet film thickness ratio increased above 15 the variation in coating thickness increases dramatically due to instabilities of the meniscus during the coating application process.

It has been observed that very low solids contents (0.3% solids, comparative experiments H and M) result in less homogeneous coatings. Furthermore, very low solids contents lead to an unacceptable level of evaporation effects (striations) at the side of the coating. These striations are likely caused by marangoni effects (local differences in surface tension due faster evaporation of the alcohol than the water). Thick wet films (>100 micron) take >5 minutes to dry which has a negative impact on the production efficiency and gives rise to undesired evaporation effects (striations) and poor homogeneity of the coating.

On the other hand high solids contents (>10%) resulted in obstructions/blockage of the die opening, resulting in rivulets of coating (meniscus break up lines) on the substrate. Another disadvantage of a high solids content is the required thin wet film thickness (<5 micron). In relation to the thin wet film thickness the coating gap needs to be reduced to <50 micron to obtain a stable coating meniscus. Coating gaps of <50 micron are not preferred due to the thickness/flatness variation of the glass substrate, which was found to be 25-40 micron (for 2 mm thick float glass sheets of 820×600 mm). Larger coating gaps may be required for larger glass plates with larger thickness variations or warpage.

Figure 2:
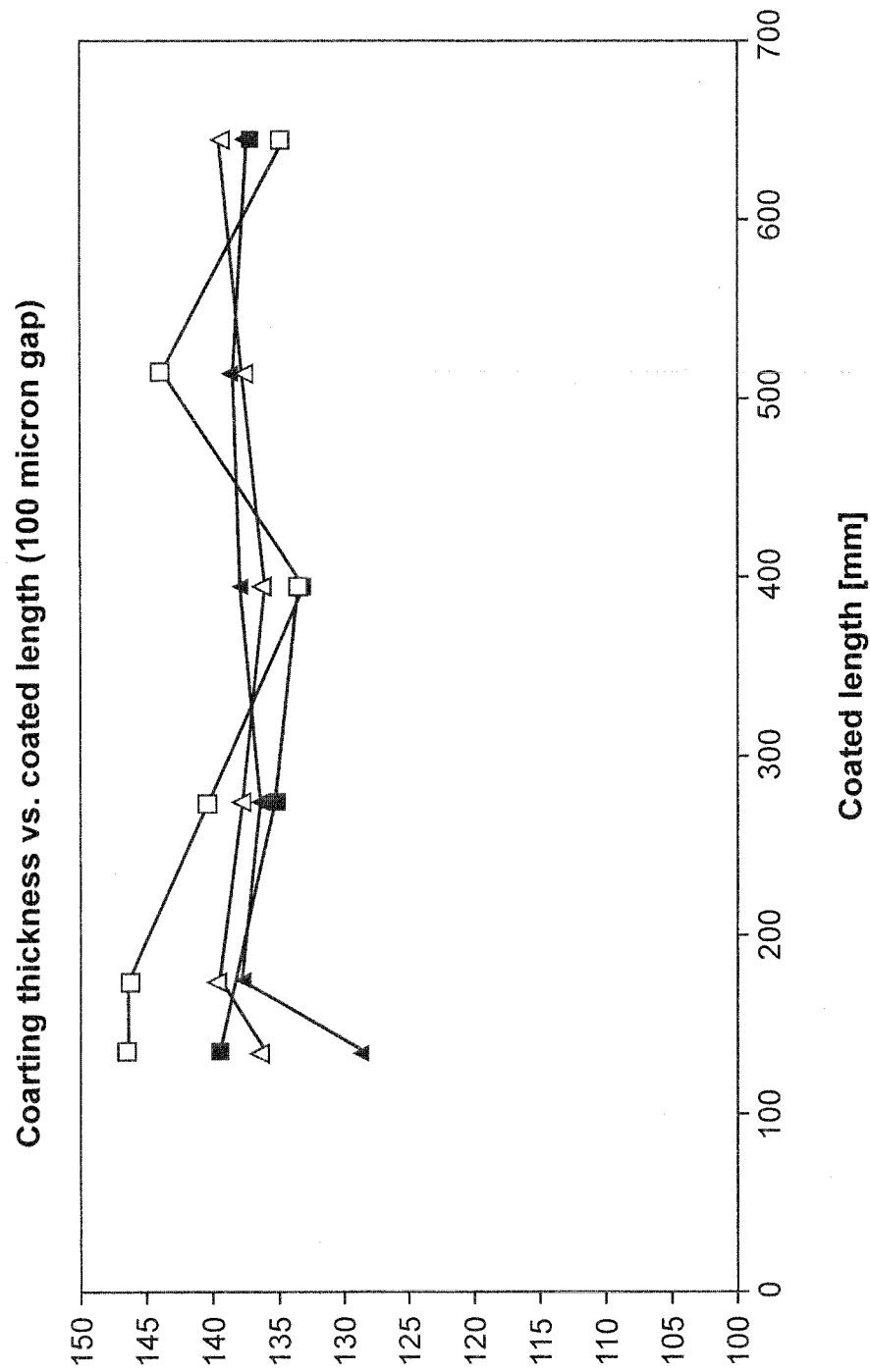
FIG. 2 is a graph showing spectroscopic measurements of the coatings of experiment 9 (triangular reference points) and experiment 10 (square reference points) described below.

All coatings show a very constant coating thickness along the coated length. This was confirmed in the visual test and in the spectroscopic evaluation. As an example, the results of the spectroscopic measurements of experiments 9 (triangular reference points) and 10 (square reference points), are illustrated in FIG. 2. There is no upward or downward trend in coating thickness visible over the coated distance of 500 mm. This indicates that a coating thickness with no effective gradient (e.g. less than 10 nm and preferably less than 5 nm per meter coated length) is feasible with the coating process of the present invention.

TABLE 3a

| Exp. # | solids content [% w/w] | coating gap [μm] | wet film thickness [μm] | coating gap/wet film thickness | Vacuum assistance | Av. coating thickness | 2σ coating variance (nm) | Visual test |
|---|---|---|---|---|---|---|---|---|
| A | 12.0 | 30 | 3.8 | 8.0 | Up to −15 mbar tested | Unstable meniscus | | Fail |
| B | 8.0 | 30 | 3.8 | 8.0 | Up to −41 mbar tested | Unstable meniscus | | Fail |
| C | 12.0 | 50 | 2.5 | 20.0 | No | Unstable meniscus | | Fail |
| D | 5.0 | 50 | 7.8 | 6.4 | No | 118 | 14 | Fail |
| 1 | 5.0 | 50 | 8.4 | 5.9 | −4 mbar | 126 | 11 | Pass |
| 2 | 5.0 | 50 | 11.3 | 4.4 | No | 121 | 11 | Pass |
| 3 | 3.2 | 50 | 12.5 | 4.0 | No | 143 | 6 | Pass |
| 4 | 2.1 | 50 | 18.8 | 2.7 | No | 138 | 7 | Pass |
| 5 | 1.6 | 50 | 25.0 | 2.0 | No | 137 | 5 | Pass |
| 6 | 1.1 | 50 | 35.0 | 1.4 | No | 126 | 12 | Pass |
| E | 5.0 | 100 | 7.2 | 13.9 | −3 mbar | Unstable meniscus | | Fail |
| 7 | 5.0 | 100 | 8.4 | 11.9 | −3 mbar | 126 | 11 | Pass |
| 8 | 3.2 | 100 | 12.5 | 8.0 | No | 141 | 8 | Pass |
| 9 | 2.1 | 100 | 18.8 | 5.3 | No | 137 | 4 | Pass |
| 10 | 1.6 | 100 | 25.0 | 4.0 | No | 138 | 8 | Pass |
| 11 | 1.1 | 100 | 35.0 | 2.9 | No | 116 | 16 | Pass |

TABLE 3b

| Exp. # | solids content [% w/w] | coating gap [μm] | wet film thickness [μm] | coating gap/wet film thickness | Vacuum assistance | Av. coating thickness | 2σ coating variance (nm) | Visual test |
|---|---|---|---|---|---|---|---|---|
| F | 3.2 | 200 | 12.5 | 16.0 | No | Unstable meniscus | | Fail |
| G | 3.2 | 200 | 12.5 | 16.0 | Up to −40 mbar tested | Unstable meniscus | | Fail |
| 12 | 2.1 | 200 | 18.8 | 10.7 | No | 138 | 6 | Pass |
| 13 | 1.6 | 200 | 25.0 | 8.0 | No | 138 | 8 | Pass |
| 14 | 1.1 | 200 | 35.0 | 5.7 | No | 120 | 6 | Pass |
| H | 0.3 | 200 | 131.3 | 1.5 | No | 128 | 44 | Fail |
| I | 2.1 | 300 | 17.5 | 17.1 | No | Unstable meniscus | | Fail |
| J | 2.1 | 300 | 17.5 | 17.1 | −5 mbar | Unstable meniscus | | Fail |
| K | 2.1 | 300 | 17.5 | 17.1 | −10 mbar | Unstable meniscus | | Fail |
| L | 2.1 | 300 | 17.5 | 17.1 | −14 mbar | Unstable meniscus | | Fail |
| 15 | 1.6 | 300 | 21.3 | 14.1 | No | 127 | 8 | Pass |
| 16 | 1.1 | 300 | 32.5 | 9.2 | No | 112 | 18 | Pass |
| M | 0.3 | 500 | 131.3 | 3.8 | No | 117 | 40 | Fail |

Example 2

This example shows the reduction in reflection of the coated side compared to the same type of glass uncoated. Of the coating experiments represented in table 4 the average reflection over the wavelength range from 425 to 675 nm was determined and represented in table 4. (Average reduction of the reflection between 425-675 nm at the coated side of the glass).

Table 4 shows that the achieved reduction in reflection on the coated side is between 46.5% and 76.9%, with a lower solids loading correlating with a greater reduction in reflection. Each side of the uncoated glass reflects 4.9% of the light between 425 and 675 nm (half of the total measured reflection, which is 9.8%). The reflection of the only the coated side has been calculated by subtracting the 4.9% reflection of the uncoated side. It was observed that the reflection at the coated side has been reduced by 2.3% to 3.8%. The light transmission and thereby, for example, the power output efficiency of a solar cell is expected to increase with a similar percentage (2-4%), compared to a solar cell containing conventional glass.

TABLE 4

| Exp #. | Formulation description | Average reflection 425-675 nm [%] | Reflection 425-675 nm of coated side only [%] | Reduction in reflection between 425-675 nm on coated side [%] |
|---|---|---|---|---|
| Ref. | Uncoated glass | 9.8 | — | — |
| 22 | 3.2% solids | 7.5 | 2.6 | 46.5 |
| 23 | 2.1% solids | 6.8 | 1.9 | 60.8 |
| 24 | 1.6% solids | 6.9 | 2.0 | 58.9 |
| 25 | 1.1% solids | 6.4 | 1.5 | 70.0 |
| 26 | 3.2% solids | 7.5 | 2.6 | 47.0 |
| 27 | 2.1% solids | 6.8 | 1.9 | 60.3 |
| 28 | 1.6% solids | 7.1 | 2.2 | 55.2 |
| 29 | 1.1% solids | 6.0 | 1.1 | 76.7 |
| 30 | 2.1% solids | 6.9 | 2.0 | 58.5 |
| 31 | 1.6% solids | 7.1 | 2.2 | 54.4 |
| 32 | 1.1% solids | 6.0 | 1.2 | 76.3 |
| 33 | 1.1% solids | 6.0 | 1.1 | 76.9 |

Example 3

In this example the variation in coating thickness and potential coating thickness gradient over the coated length has been investigated in relation to the reflection of the coated side of the glass.

Table 5 shows that the coating thickness is independent of the coating speed in this coating process, this in contrast to other coating techniques (i.e. dip coating). Furthermore no coating gradient is observed for the investigated coating speeds (2 to 20 m/min), which again is a quality defect inherent to dip coating techniques.

TABLE 5

| Exp #. | solids content [% w/w] | coating gap [μm] | wet film thickness [μm] | ratio coating gap/wet film thickness | Coating speed [m/min] | Average reflection minimum [%] | 2σ on reflection minimum [%] | Average coating thickness [nm] | 2x STDEV on coating thickness [nm] | Visual test |
|---|---|---|---|---|---|---|---|---|---|---|
| 17 | 2.1 | 100 | 17.5 | 5.7 | 2 | 1.01 | 0.20 | 131 | 8 | Pass |
| 18 | 2.1 | 100 | 17.5 | 5.7 | 5 | 0.87 | 0.12 | 124 | 10 | Pass |
| 19 | 2.1 | 100 | 17.5 | 5.7 | 8 | 0.44 | 0.22 | 137 | 5 | Pass |
| 20 | 2.1 | 100 | 17.5 | 5.7 | 10 | 0.26 | 0.13 | 127 | 6 | Pass |
| 21 | 2.1 | 100 | 17.5 | 5.7 | 20 | 0.84 | 0.19 | 130 | 11 | Pass |

The invention claimed is:

1. A process for applying an optical coating to a substrate comprising the steps of:
   (a) preparing an optical coating formulation comprising a solvent component and a film forming component;
   (b) using a die coater comprising a slot die to form a coated substrate by applying the optical coating to a substrate, where the applied optical coating forms a wet film thereon having a wet film thickness from 8 μm to 100 μm;
   (c) drying the coated substrate, where the coated substrate is in a substantially horizontal plane thereby converting the wet film to a dry film having a dry film thickness of more than 20 nm and less than 500 nm; and, optionally
   (d) curing the coated substrate, wherein
   the optical coating formulation comprises greater than 0.3 wt % to no more than 5 wt % solids relative to the total weight of the optical coating formulation; and wherein
   the slot die comprises a slot gap defined by an upstream lip and a downstream lip, the upstream lip being positioned upstream from the flow of the optical coating and having a lip thickness of 0.15-5 mm and the downstream lip being positioned downstream from the flow of the optical coating and having a lip thickness of 0.15-2 mm, and wherein
   the slot gap is in the range of 1.1 to 9 times the thickness of the wet film, and wherein
   a coating gap of at least 20 μm is defined between the downstream lip distal to the slot gap and the substrate, and establishes a ratio of the coating gap to the wet film thickness of at most 15.

2. The process according to claim 1, wherein the coating formulation comprises no more than 3 wt % solids.

3. The process according to claim 1, wherein the film forming component comprises at least 30 wt % nano-particles relative to the total weight of solids in the coating formulation.

4. The process according to claim 3, wherein the nano-particles comprises at least one inorganic oxide or inorganic oxide precursor.

5. The process according to claim 1, wherein the coating is applied as a single layer.

6. The process according to claim 1, wherein the surface tension of the coating formulation is in the range of 20 to 73 mN·m-1 (dyn·cm-1).

7. The process according to claim 1, wherein the solvent component comprises a solvent selected from the group consisting of methanol, ethanol, methyl ethyl ketone, acetone, 1-propanol, 2-propanol or 1-methoxypropan-2-ol, 1-butanol, 2-butanol, 2-methyl-2-propanol or combinations thereof.

8. The process according to claim 1, wherein the film forming component comprises at least one oligomeric or polymeric compound.

9. The process according to claim 1, wherein the slot die comprises a slot die gap of at least 1.5 times the thickness of the wet film in combination with a reduced pressure means for stabilization of the upstream bead meniscus of the applied optical coating.

10. The process according to claim 1, wherein the substrate is coated at a coating speed of at least 5 meters per minute and less than 100 meters per minute.

11. The process according to claim 1, wherein the slot gap is between 1.5 and 7 times the wet film thickness.

12. The process according to claim 1, wherein the upstream lip has a lip thickness of 0.2-2 mm, and the downstream lip has a lip thickness of 0.2-0.9 mm.

13. The process according to claim 1, wherein the coating gap is at least 40 μm and not more than 1000 μm.

* * * * *